(12) United States Patent
Yousuf

(10) Patent No.: US 8,527,139 B1
(45) Date of Patent: Sep. 3, 2013

(54) SECURITY SYSTEMS AND METHODS WITH RANDOM AND MULTIPLE CHANGE-RESPONSE TESTING

(75) Inventor: Mohammed Abdulla Yousuf, Ann Arbor, MI (US)

(73) Assignee: GM Global Technology Operations LLC

( * ) Notice: Subject to any disclaimer, the term of this patent is extended or adjusted under 35 U.S.C. 154(b) by 0 days.

(21) Appl. No.: 13/596,250

(22) Filed: Aug. 28, 2012

(51) Int. Cl.
*G06F 19/00* (2011.01)
(52) U.S. Cl.
USPC ....... 701/32.8; 701/29.1; 701/31.4; 701/33.2; 701/32.7; 180/65.1; 180/65.21; 340/901; 340/3.1; 340/3.43; 340/10.5; 713/150; 713/189; 726/27
(58) Field of Classification Search
None
See application file for complete search history.

(56) References Cited

U.S. PATENT DOCUMENTS

| 8,244,426 B2 * | 8/2012 | Buur et al. | 701/29.2 |
| 8,364,975 B2 * | 1/2013 | Kumar et al. | 713/189 |
| 2010/0211770 A1 * | 8/2010 | Alrabady et al. | 713/150 |
| 2012/0041636 A1 * | 2/2012 | Johnson et al. | 701/31.4 |

OTHER PUBLICATIONS

U.S. Appl. No. 13/596,239, filed Aug. 28, 2012, Yousuf.

* cited by examiner

*Primary Examiner* — Redhwan k Mawari

(57) ABSTRACT

A diagnostic system for a vehicle includes a first processor module and a second processor module. The first processor module includes a first microprocessor and memory. The second processor module includes a second microprocessor and memory. The second processor module: selectively transmits a first challenge to the first processor module for a first challenge-response test; selectively transmits a second challenge to the first processor module for a second challenge-response test; selectively transmits a third challenge to the first processor module for a third challenge-response test; selectively transmits a fourth challenge to the first processor module for a fourth challenge-response test; and selectively diagnoses a fault based on responses of the first processor module to the first, second, third, and fourth challenges. The first, second, third, and fourth challenge-response tests are each different types of challenge-response tests.

20 Claims, 4 Drawing Sheets

SECURITY SYSTEMS AND METHODS WITH RANDOM AND MULTIPLE CHANGE-RESPONSE TESTING

CROSS-REFERENCE TO RELATED APPLICATIONS

This application is related to U.S. patent application Ser. No. 13/596,239 filed on Aug. 28, 2012. The disclosure of the above application is incorporated herein by reference in its entirety.

FIELD

The present disclosure relates to vehicle control systems and more specifically to microprocessor security systems and methods of vehicles.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A vehicle includes a plurality of systems, such as a powertrain system, a brake system, a fuel system, etc. Each system includes a plurality of hardware components and safety mechanisms. A safety mechanism may be a physical safety mechanism or a piece of software executed by a processor to act as a safety mechanism. A safety mechanism for a hardware component may perform a remedial action to provide a level of safety if the hardware component fails.

Systems of electrical components of the vehicle may be required to comply with one or more automotive hardware integrity requirements, such as standard 26262 of the International Organization for Standardization (ISO). For example only, a hazard that could occur when one or more elements of a system fail may be required to have a probability of occurrence that is less than a predetermined probability to comply with the ISO 26262 standard.

SUMMARY

A diagnostic system for a vehicle includes a first processor module and a second processor module. The first processor module includes a first microprocessor and memory. The second processor module includes a second microprocessor and memory. The second processor module: selectively transmits a first challenge to the first processor module for a first challenge-response test; selectively transmits a second challenge to the first processor module for a second challenge-response test; selectively transmits a third challenge to the first processor module for a third challenge-response test; selectively transmits a fourth challenge to the first processor module for a fourth challenge-response test; and selectively diagnoses a fault based on responses of the first processor module to the first, second, third, and fourth challenges. The first, second, third, and fourth challenge-response tests are each different types of challenge-response tests.

A diagnostic method for a vehicle, includes: providing a first processor module having a first microprocessor and memory; and, at a second processor module that includes a second microprocessor and memory: selectively transmitting a first challenge to the first processor module for a first challenge-response test; selectively transmitting a second challenge to the first processor module for a second challenge-response test; selectively transmitting a third challenge to the first processor module for a third challenge-response test; selectively transmitting a fourth challenge to the first processor module for a fourth challenge-response test; and selectively diagnosing a fault based on responses of the first processor module to the first, second, third, and fourth challenges. The first, second, third, and fourth challenge-response tests are each different types of challenge-response tests.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
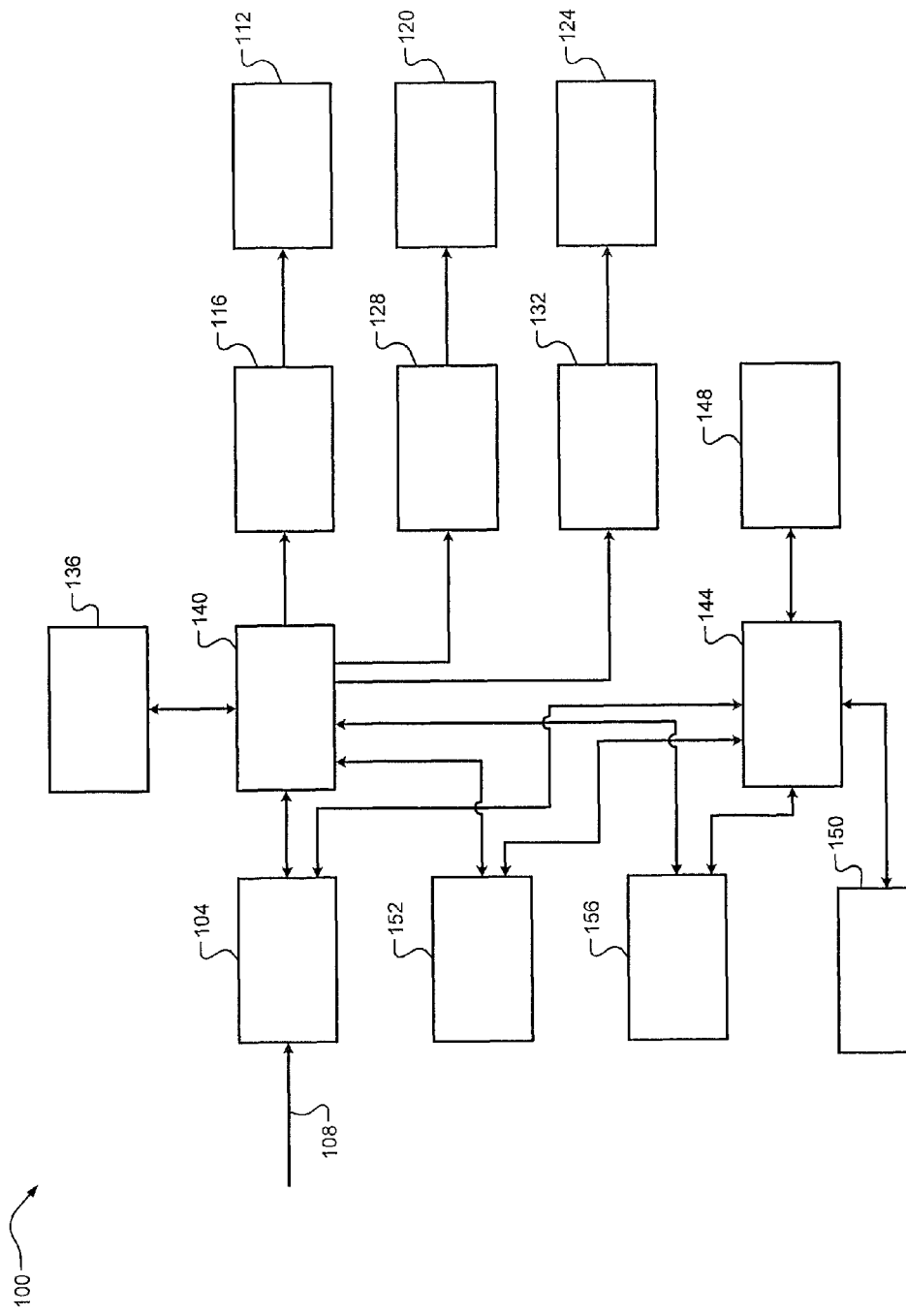
FIG. 1 is a functional block diagram of an example vehicle system according to the present disclosure.

Vehicle steering, vehicle braking, and vehicle acceleration/deceleration are generally controlled based on input from a driver of a vehicle. Active safety systems are systems that selectively adjust vehicle steering, vehicle braking, and/or vehicle acceleration/deceleration to supplement driver input, to counteract driver input, or independently of driver input. Active safety systems may also be referred to as safety critical embedded control (SCEC) systems and autonomous driving systems.

A vehicle may include an active safety system that selectively adjusts vehicle steering, for example, to position (e.g., center) a vehicle within a lane, to change lanes, for object avoidance, and/or for one or more other reasons. A vehicle may additionally or alternatively include an active safety system that selectively adjusts vehicle braking and/or vehicle acceleration/deceleration, for example, for collision avoidance, adaptive cruise control, collision preparation, and/or one or more other reasons.

A vehicle manufacturer develops a preliminary report for a vehicle before the vehicle is made available for sale to the public. The preliminary report may indicate a hazard that could occur when one or more elements of a system of the vehicle fail. A classification for the system may be defined by an automotive hardware integrity standard, such as the 26262 standard developed by the International Organization for Standardization (ISO). Active safety systems may be classified, for example, within automotive safety integrity level (ASIL) D of the ISO 26262 standard.

Automotive grade microprocessors have been specifically designed for compliance with one or more of the ASIL classifications of the ISO 26262 standard. An active safety system may include one automotive grade microprocessor that performs the processing for and operation of the active safety system. By itself, however, the one automotive grade microprocessor could not achieve one or more requirements of the ASIL D classification. Additionally, automotive grade microprocessors are costly and large, and implementing a plurality (e.g., three) of automotive grade microprocessors along with associated functionality may be complex.

Active safety systems can therefore include an automotive grade microprocessor and at least one graphical microprocessor. Graphical microprocessors are typically used in processing intensive, embedded systems with one or more displays, such as smart phones, tablet computers, navigation systems, etc. Graphical microprocessors are not used in active safety systems of vehicles because of their non-compliance with any of ASIL classifications.

The present disclosure describes systems and methods for performing a randomized challenge-response test to bring a processor module and an external object calculation module (EOCM) into compliance with one or more of the ASIL classifications. The randomized challenge-response test involves a first processor module performing multiple (e.g., four or more) different types of challenge-response tests with a second processor module.

Each challenge-response test includes the first processor module sending a challenge (e.g., seed or token) to the second processor module and verifying that a response of the second processor module determined based on the challenge is the same as an expected response. Each challenge-response test also includes the first processor module verifying that the response is provided within a predetermined period. The first processor module may diagnose a fault when a response is different than an expected response and/or the second processor module fails to provide a response within a predetermined period after transmission of a challenge.

For at least one of the challenge-response tests, a dynamic variable may be used for the challenge portion of the test. Dynamic variables may be, for example, measured using sensors, determined based on one or more other dynamic variables, etc.

The random selection of the type of challenge-response test to be performed increases the reliability of each challenge-response test and the reliability of the randomized challenge-response test by decreasing the likelihood that the second processor module could respond correctly when a fault is present. The use of one or more dynamic variables also increases the reliability of a challenge-response test and the reliability of the randomized challenge-response test by decreasing the likelihood that the second processor module could respond correctly when a fault is present.

The present disclosure will be discussed in terms of vehicle systems and, more specifically, active safety systems. However, the present disclosure is also applicable to other vehicle systems and other systems. Referring now to FIG. 1, a functional block diagram of a vehicle system 100 including an active safety system is presented. An engine control module (ECM) 104 controls engine actuators based on one or more driver inputs 108. The driver inputs 108 may include accelerator pedal position (APP), brake pedal position (BPP), steering wheel position (also called steering angle), cruise control inputs, and other driver inputs.

The ECM 104 may, for example, determine a desired opening of a throttle valve 112 based on one or more of the driver inputs 108. A throttle actuator module 116 may actuate the throttle valve 112 based on the desired opening. While not shown, other engine actuators include, but are not limited to, fuel injectors, spark plugs, exhaust gas recirculation (EGR) valves, boost devices, valve actuators and/or phasers, etc.

The ECM 104 may also control one or more other actuators based on one or more of the driver inputs 108, such as a power steering motor 120 and (friction) brakes 124. The ECM 104 may, for example, determine a desired steering angle based on the steering wheel position and determine a desired braking force based on the BPP. A steering actuator module 128 may actuate the power steering motor 120 based on the desired steering angle. A brake actuator module 132 may actuate the brakes 124 based on the desired braking force.

In addition to or as an alternative to the driver inputs 108, the ECM 104 may control one or more of the actuators based on one or more parameters measured by sensors 136. The sensors 136 may include, for example, an intake air temperature sensor, a mass air flowrate (MAF) sensor, a manifold pressure sensor, oil and coolant temperature sensors, wheel speed sensors, and various other temperature, position, pressure, and speed sensors.

The ECM 104 and other modules of the vehicle may transmit and receive data via one or more car area network (CAN) busses, such as CAN bus 140. The ECM 104 and other modules of the vehicle may additionally or alternatively transmit and receive data via one or more other data busses, such as FlexRay bus 144. The FlexRay bus 144 is a data bus where communication is performed according to a FlexRay communication protocol.

Data from sensors 148 that can be used to determine relationships between the vehicle and features outside of the vehicle may be received via the FlexRay bus 144. Data from other things, such as a global positioning system (GPS) 150, may also be received via the FlexRay bus 144 or another suitable bus. The GPS 150 determines a location of the vehicle. The sensors 148 may include, for example, one or more Lidar (light detection and ranging) sensors, one or more radar based sensors, one or more laser based sensors, optical sensors, one or more cameras, and/or one or more other sensors that can be used to determine relationships between the vehicle and features (e.g., lanes, objects, etc.) outside of (i.e., that are external to) the vehicle.

The vehicle may include one or more active safety systems that selectively control one or more of vehicle steering, vehicle braking, and vehicle acceleration/deceleration based on one or more measured parameters to supplement the driver inputs 108, to counteract the driver inputs 108, or independent of the driver inputs 108. One example active safety system selectively adjusts vehicle steering via the power steering motor 120, for example, to position (e.g., center) a vehicle within a lane, to change lanes, for object avoidance, and/or for one or more other reasons. Another example active safety system selectively adjusts vehicle braking via the brakes 124 and/or vehicle acceleration/deceleration via the throttle valve 112, for example, for collision avoidance, for adaptive cruise control, for collision preparation, and/or for one or more other reasons.

An active safety system is a system that selectively actuates the throttle valve 112, the power steering motor 120, and/or the brakes 124 to supplement the driver inputs 108, to counteract the driver inputs 108, or independent of the driver inputs 108. Active safety systems can be referred to as semi-autonomous systems. The present disclosure is also applicable to autonomous vehicle systems.

The example active safety system includes a primary external object calculating module (EOCM) 152. The primary EOCM 152 (see also FIG. 2) selectively actuates the throttle valve 112, the power steering motor 120, and/or the brakes 124 to supplement the driver inputs 108, to counteract the driver inputs 108, or independent of the driver inputs 108.

The example active safety system also includes a redundant EOCM 156. The redundant EOCM 156 functions similarly or identically to the primary EOCM 152. In the event that a fault is detected in the primary EOCM 152, control is transferred from the primary EOCM 152 to the redundant EOCM 156, and the redundant EOCM 156 selectively actuates the throttle valve 112, the power steering motor 120, and/or the brakes 124. As the primary and redundant EOCMs 152 and 156 are functionally similar or identical, only the primary EOCM 152 will be discussed.

Figure 2:
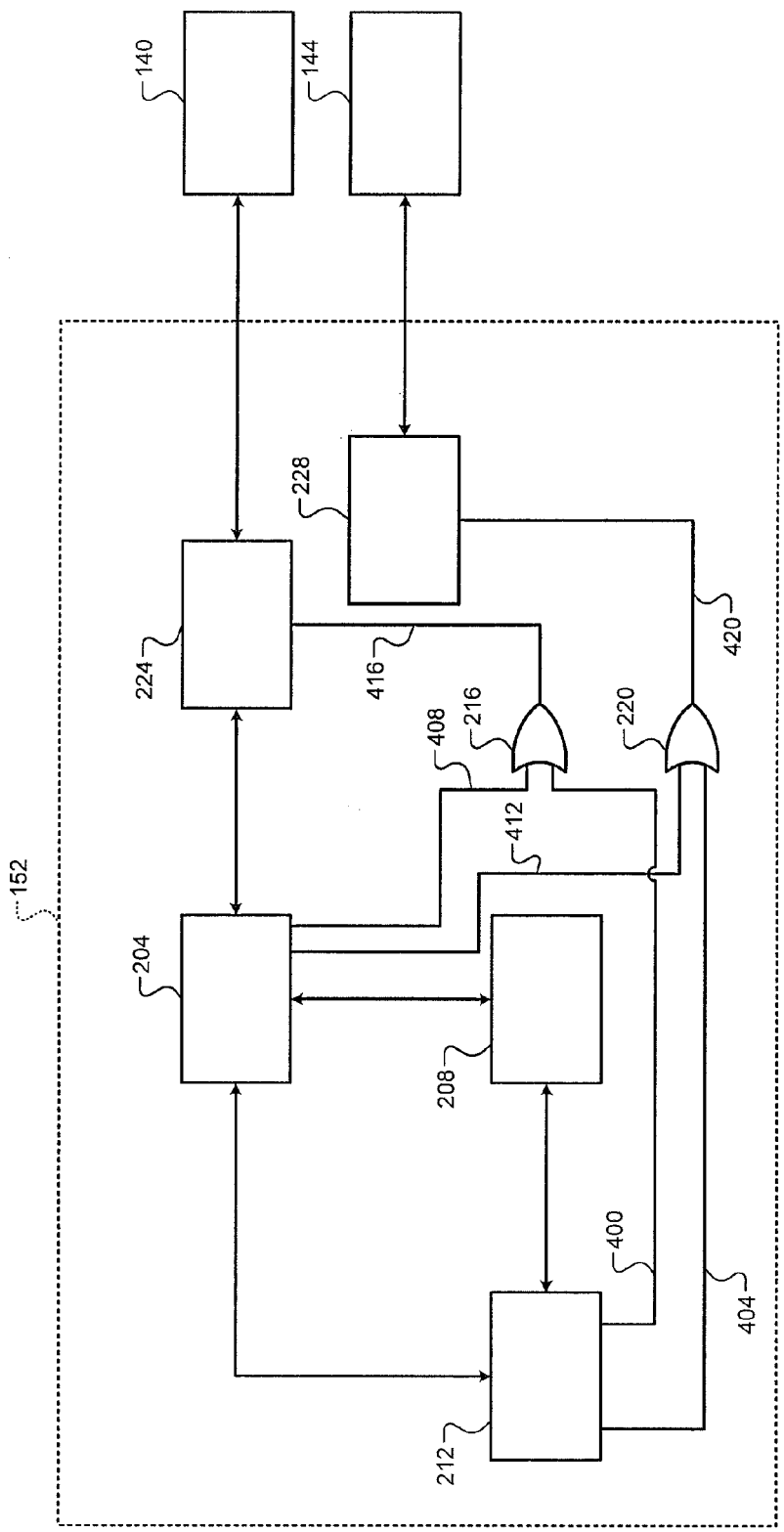
FIG. 2 is a functional block diagram of an example external object calculation module according to the present disclosure.
Figure 3:
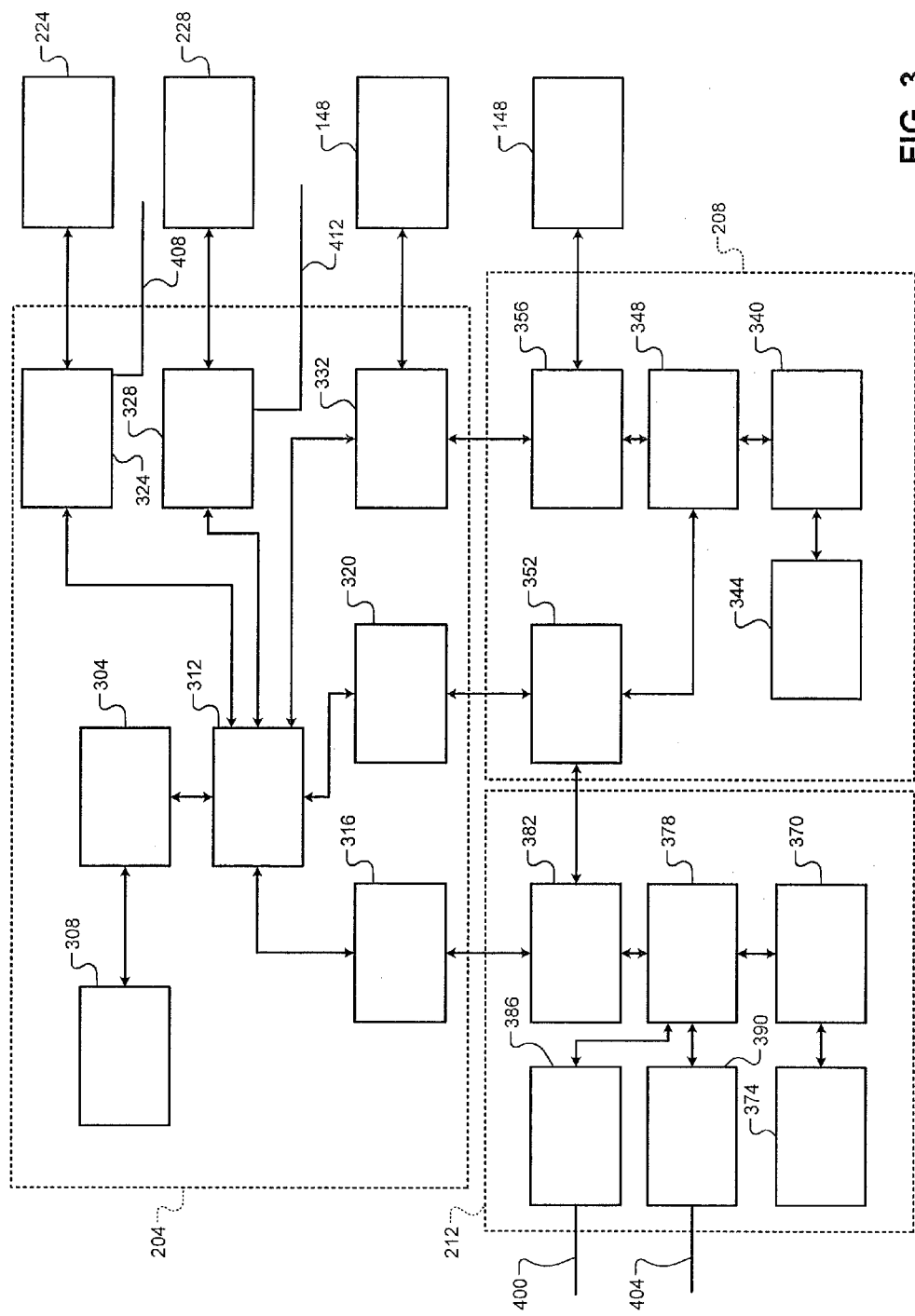
FIG. 3 is a functional block diagram of example processor modules of the external object calculation module according to the present disclosure.

Referring now to FIG. 2, a functional block diagram of the primary EOCM 152 is presented. The primary EOCM 152 includes a first processor module 204, a second processor module 208, a third processor module 212, a CAN bus disabling module 216, and a FlexRay bus disabling module 220. FIG. 3 includes functional block diagrams of the first processor module 204, the second processor module 208, and the third processor module 212.

Referring now to FIGS. 2 and 3, the first processor module 204 includes a processor 304, memory 308, common resources 312, a first serial packet interface (SPI) 316, and a second SPI 320. The first processor module 204 also includes a CAN transceiver 324, a FlexRay transceiver 328, and an Ethernet transceiver 332. The memory 308 may include, for example, external random access memory (RAM), external electrically erasable programmable read only memory (EEPROM), and/or other suitable types of memory. Code that is executed by the first processor module 204 for performing the functions described herein and other functions is stored in the memory 308.

The first processor module 204 may be an automotive grade processor module, such as a Kimodo manufactured by Freescale. The first processor module 204 may satisfy each of the following minimum characteristics:

Dual-core, 180 Megahertz (MHz) microprocessor;
900 Dhrystone million instructions per second (DMIPS);
1 Megabytes (MB) of flash memory; and
0.5 MB of RAM.

The first processor module 204 receives data from the sensors 136 via the CAN transceiver 324. The first processor module 204 transmits data to the CAN buses and receives data from the CAN buses via the CAN transceiver 324. The first processor module 204 transmits data to the FlexRay bus 144 and receives data from the FlexRay bus 144 via the FlexRay transceiver 328. The first processor module 204 may receive data from one or more of the sensors 148 via the FlexRay transceiver 328.

The first processor module 204 may receive data from one or more of the sensors 148 via the Ethernet transceiver 332. The first processor module 204 may receive the location of the vehicle via the CAN transceiver 324, the FlexRay transceiver 328, the Ethernet transceiver 332, or in another suitable manner. The first processor module 204 transmits data to the second processor module 208 and receives data from the second processor module 208 via the Ethernet transceiver 332. For example, the first processor module 204 may transmit data received from sensors (e.g., the sensors 136 and/or the sensors 148) and/or the GPS 150 to the second processor module 208 via the Ethernet transceiver 332.

The first processor module 204 also transmits data to the second processor module 208 and receives data from the second processor module 208 via the second SPI 320. For example, the first processor module 204 may transmit data received from sensors (e.g., the sensors 136 and/or the sensors 148) and/or the GPS 150 to the second processor module 208 via the second SPI 320. The first processor module 204 transmits data to the third processor module 212 and receives data from the third processor module 212 via the first SPI 316.

The second processor module 208 includes a processor 340, memory 344, common resources 348, an SPI 352, and an Ethernet transceiver 356. The memory 344 may include, for example, RAM, Flash, and/or other suitable types of memory. Code that is executed by the second processor module 208 for performing the functions described herein and other functions is stored in the memory 344. The second processor module 208 may include a graphical microprocessor, such as a Cortex-A9 manufactured by ARM or an Integra 4 manufactured by Nvidia. The second processor module 208 may satisfy each of the following minimum characteristics:

Quad-core, 1 Gigahertz (GHz) microprocessor;
9600 DMIPS;
10 MB Flash memory and ROM;
0.5 Gigabytes (GB) RAM;
a temperature monitor;
a watchdog; and
a clock and reset.

The second processor module 208 may be lightly embedded in the active safety system. Lightly embedded may mean that the second processor module 208 is not used in hard-time systems and a response time of one second or more is acceptable. By way of contrast, the first processor module 204 may be embedded, which may mean that response times of greater than one second are not acceptable and even response times that are less than one second may not be acceptable.

The second processor module 208 may receive data from one or more of the sensors 148 via the Ethernet transceiver 356. The second processor module 208 transmits data to the first processor module 204 and receives data from the first processor module 204 via the Ethernet transceiver 356. The second processor module 208 also transmits data to the first processor module 204 and receives data from the first processor module 204 via the SPI 352. The second processor module transmits data to the third processor module 212 and receives data from the third processor module 212 via the SPI 352.

The third processor module 212 includes a processor 370, memory 374, common resources 378, an SPI 382, a CAN bus transceiver 386, and a FlexRay transceiver 390. Code that is executed by the third processor module 212 for performing the functions described herein and other functions is stored in the memory 374. The third processor module 212 transmits data to the first processor module 204 and receives data from the first processor module 204 via the SPI 382. The third processor module 212 also transmits data to the second processor module 208 and receives data from the second processor module 208 via the SPI 382.

The second processor module 208 processes data from the sensors, such as the sensors 136 and 148. For example, based on received data from the sensors 148 and the GPS 150, the second processor module 208 may perform the processing intensive functions, such as identifying lane lines, determining a relationship between the vehicle and the lane lines (e.g., position of the vehicle between the lane lines), identifying objects that are outside of the vehicle, determining relationships between the vehicle and identified objects, determining shapes and sizes of the objects, determining a target path of the vehicle, determining an actual path of the vehicle, determining obstacles in a path of the vehicle, etc.

The first processor module 204 determines whether to actuate the throttle valve 112, the power steering motor 120, and/or the brakes 124 based on data resulting from the processing performed by the second processor module 208.

When it is decided that the throttle valve 112, the power steering motor 120, and/or the brakes 124 should be actuated, the first processor module 204 determines the extent of the actuation, the rate at which the actuation should be performed, the length (period) of the actuation, etc. The first processor module 204 outputs commands to the actuator module(s) accordingly. The first processor module 204 may output commands to the actuator module(s), respectively, to supplement desired values determined based on the driver inputs 108, to counteract desired values determined based on the driver inputs 108, or independently of the driver inputs 108. In this manner, the first processor module 204 may provide at least semi-autonomous driving.

The third processor module 212 performs various functions to bring the safety integrity level of the second processor module 208 and the primary EOCM 152 into compliance with one or more of the ASIL classifications, such as the ASIL B standard, the ASIL C standard, or the ASIL D standard. Based on the safety integrity level of the second processor module 208 (e.g., ASIL B) and the safety integrity level of the first processor module 204, the primary EOCM 152 may reach a safety integrity level of ASIL D.

For example, the third processor module 212 verifies that the second processor module 208 calls functions in a predefined order and verifies that the second processor module 208 completes each function within a predetermined period. The third processor module 212 also ensures that the data from the sensors that is being processed by the second processor module 208 is the same as the data that is or may be being used by one or more other modules. This may be referred to as frame counting.

The third processor module 212 also verifies that the second processor module 208 is healthy. Verifying that the second processor module 208 is healthy includes performing a randomized challenge-response test as described further below (see FIG. 4).

Generally speaking, the randomized challenge-response test involves the third processor module 212 performing N different types of challenge-response tests in a random order, where N is an integer greater than one. For example, N may be 3, 4, 5, 6, or another suitable integer that is greater than one.

Each challenge-response test includes the third processor module 212 sending a challenge (e.g., seed or token) to the second processor module 208 and verifying that a response of the second processor module 208 determined from the challenge is the same as an expected response and that the response is provided within a predetermined period. For at least one of the challenge-response tests, a dynamic variable is used for the challenge portion of the test, such as vehicle speed or another suitable dynamic variable. A dynamic variable can be a variable/parameter that changes with time or variable/parameter that can change with time. Dynamic variables may be, for example, measured using sensors, determined based on one or more other dynamic variables, etc.

Verifying that the second processor module 208 is healthy may also include prompting the second processor module 208 to report that it is healthy. The third processor module 212 may also verify that the first processor module 204 is healthy, the first processor module 204 may also verify that the third processor module 212 is healthy, and/or the second processor module 208 may verify that the third processor module 212 is healthy.

The third processor module 212 may also verify that the second processor module 208 times out for less than a predetermined period in response to a prompt from the third processor module 212. The third processor module 212 may also verify that the processor cores of the second processor module 208 are synchronized.

The third processor module 212 may also verify that two of the cores of the second processor module 208 are executing redundant/identical functions (portions of code) that are stored in separate blocks of the memory 344. This verification may be performed, for example, by comparing results determined by two of the cores at a third core and verifying that the third core reports that the comparison of the results indicates that the results are the same.

The third processor module 212 may also verify that the second processor module 208 satisfies serial data transfer requirements for serial data integrity as defined under the ASIL B classification. The third processor module 212 may verify that checksum values calculated based on data stored in memory blocks of non-volatile memory (NVM) of the second processor module 208 are equal to expected checksum values. The third processor module 212 may also perform one or more verifications that are defined under the ASIL B classification. The third processor module 212 may determine that a fault is present in the primary EOCM 152 when one or more of the above are not verified.

When the third processor module 212 identifies a fault in the primary EOCM 152 (e.g., in the first processor module 204 or the second processor module 208), the third processor module 212 sets first and second disabling signals 400 and 404 to an active state. When a fault has not been identified in the primary EOCM 152 by the third processor module 212, the third processor module 212 may set the first and second disabling signals 400 and 404 to an inactive state.

When the first processor module 204 identifies a fault in the primary EOCM 152 (e.g., in the second processor module 208 or the third processor module 212), the first processor module sets third and fourth disabling signals 408 and 412 to an active state. When a fault has not been identified in the primary EOCM 152 by the first processor module 204, the first processor module 204 may set the third and fourth disabling signals 408 and 412 to an inactive state.

The CAN bus disabling module 216 selectively disables communications from the primary EOCM 152 to the CAN bus 140 when the first disabling signal 400 and/or the third disabling signal 408 is in the active state. The CAN bus disabling module 216 may, for example, disable the CAN transceiver(s) 324 when the first disabling signal 400 and/or the third disabling signal 408 is in the active state. The CAN bus disabling module 216 may enable the CAN transceiver(s) 324 when both the first disabling signal 400 and the third disabling signal 408 are in the inactive state. The CAN bus disabling module 216 may enable and disable the CAN transceiver(s) 324 via an enable/disable signal 416.

The FlexRay bus disabling module 220 disables communications from the primary EOCM 152 to the FlexRay bus 144 when the second disabling signal 404 and/or the fourth disabling signal 412 is in the active state. The FlexRay bus disabling module 220 may, for example, disable the FlexRay transceiver 328 when the second disabling signal 404 and/or the fourth disabling signal 412 is in the active state. The FlexRay bus disabling module 220 may enable the FlexRay transceiver 328 when both the second disabling signal 404 and the fourth disabling signal 412 are in the inactive state. The FlexRay bus disabling module 220 may enable and disable the FlexRay transceiver 328 via an enable/disable signal 420.

In this manner, the primary EOCM 152 is prevented from actuating the power steering motor 120, the throttle valve 112, and/or the brakes 124. When a fault is present in the primary EOCM 152, the redundant EOCM 156 may take control of the active safety system and selectively actuate the power steering motor 120, the throttle valve 112, and/or the brakes 124, to supplement the driver inputs 108, to counteract the driver inputs 108, or independent of the driver inputs 108.

Figure 4:
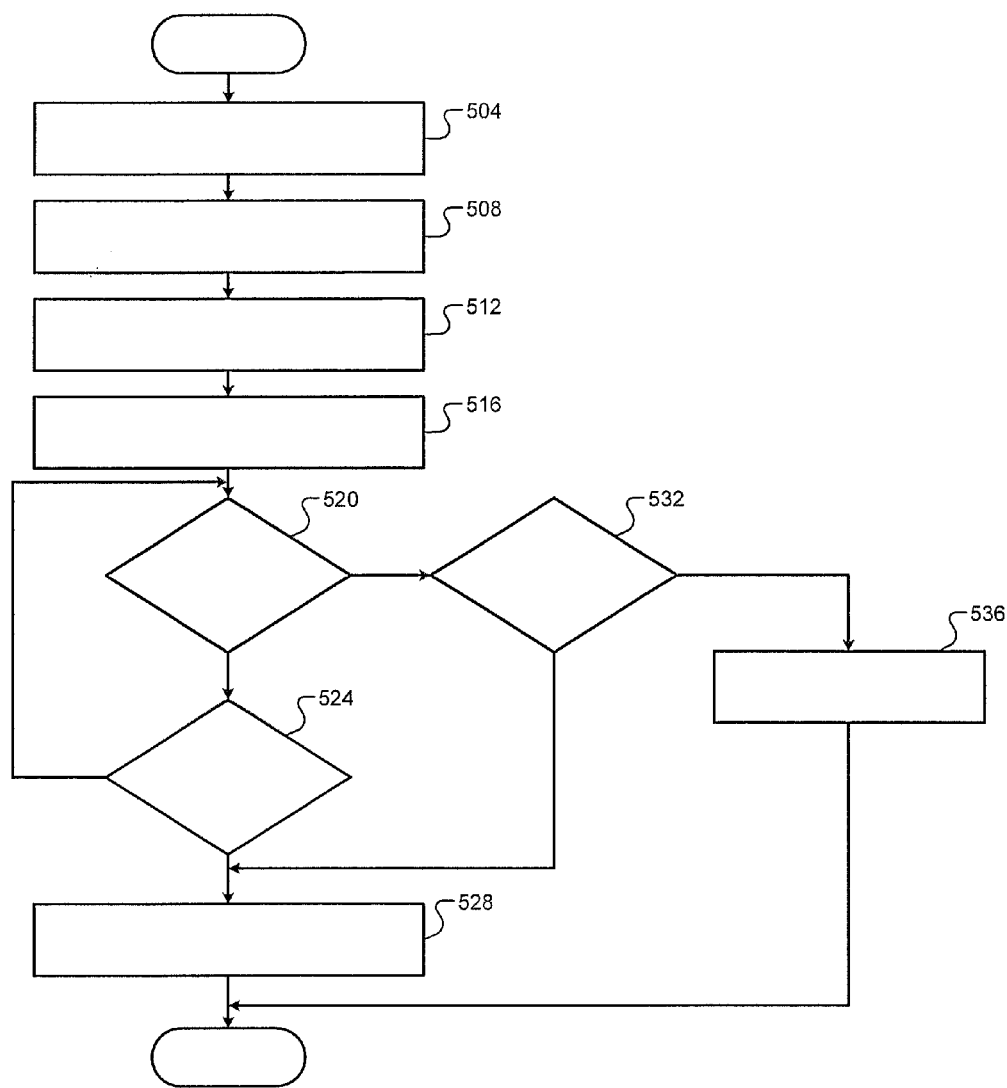
FIG. 4 is a flowchart depicting an example method of diagnosing a processor module according to the present disclosure.

Referring now to FIG. 4, a flowchart depicting an example method of performing a randomized challenge-response test for diagnosing faults in the primary EOCM 152 is presented. While FIG. 4 will be discussed in terms of the third processor module 212 diagnosing the second processor module 208, the following is generally applicable to one processor module diagnosing another processor module. For example, FIG. 4 is also applicable to the third processor module 212 diagnosing the first processor module 204, the second processor module 208 diagnosing the third processor module 212, and the second processor module 208 diagnosing the first processor module 204. FIG. 4 is also applicable to the first processor module 204 diagnosing the second processor module 208 and the first processor module 204 diagnosing the third processor module 212.

The method of FIG. 4 is performed during a pre-task stage of a control loop of the second processor module 208. The second processor module 208 executes control loops at a predetermined rate, such as one control loop per millisecond (ms), one control loop per 10 ms, or at another rate. The second processor module 208 may execute one or more tasks (portions of code) per control loop after that control loop's pre-task stage is complete.

Control begins with 504 where the third processor module 212 resets and starts a timer. While a timer is discussed, a counter may instead be used. The third processor module 212 selects a type of challenge-response test from a predetermined set of M different types of challenge-response tests at 508, where M is an integer that is greater than or equal to N. For example, M may be 3, 4, 5, 6, or another suitable integer that is greater than one and greater than or equal to N.

Types of challenge-response tests include, for example, arithmetic logic unit (ALU) tests, random access memory (RAM) health tests, register tests, power/voltage tests, clock tests, and cyclical redundancy check (CRC) tests. The type of challenge-response test dictates how the second processor module 208 should calculate a response based on a variable (the challenge) transmitted by the third processor module 212 for performing the calculation.

The third processor module 212 selects the type of challenge-response test from the set in a random order. The random order may include selecting each one of the different types of tests Q times before any the types of tests is selected for an R-th time, where Q is an integer greater than zero and R is equal to Q+1. Alternatively, the random order may include selecting the tests randomly from the predetermined set of different types of challenge-response tests independent the number of times that each of the tests has been previously selected. The selection of the type of challenge-response test to be performed at random increases the reliability of each challenge-response test and the reliability of the randomized challenge-response test by decreasing the likelihood that the second processor module 208 could respond correctly when a fault is present.

At 512, the third processor module 212 selects/sets a variable for use in the challenge-response test. One, dynamic variable may be used for each challenge-response test. Alternatively, the variable may be selected from a predetermined set of dynamic and/or static variables. The use of one or more dynamic variables also increases the reliability of a challenge-response test and the reliability of the randomized challenge-response test by decreasing the likelihood that the second processor module 208 could respond correctly when a fault is present.

The third processor module 212 transmits type of challenge-response test to be performed and the variable to the second processor module 208 at 516. If functioning properly (i.e., without the fault), the second processor module 208 will determine/calculate a response based on the variable, in the way specified by the type of challenge-response test, within a predetermined period, and the response will be the same as an expected response (for the variable and the type of challenge-response test). The predetermined period may vary by type of challenge-response test and/or variable.

The third processor module 212 determines whether a response has been received from the second processor module 208 at 520. If false, control continues with 524. If true, control transfers to 532, which is discussed further below. At 524, the third processor module 212 determines whether the period tracked by the timer is greater than the predetermined period. If true, the third processor module 212 may indicate that a fault is present in the second processor module 208 at 528, and the control loop may end. If false, control may return to 520. In this manner, the second processor module 208 has a configurable deadline/timeout period to respond to the challenge transmitted by the third processor module 212. The second processor module 208 not responding to the challenge within the deadline/timeout period may be indicative of a fault in the primary EOCM 152.

At 532 (when the third processor module 212 receives a response to the challenge from the second processor module 208), the third processor module 212 determines whether the response received is the same as (equal to) an expected response to the challenge. If true, the third processor module 212 may indicate that no fault is present in the primary EOCM 152 at 536. If false, the third processor module 212 may indicate that a fault is present in the primary EOCM 152 at 528, and the control loop may end. The third processor module 212 may determine/calculate the expected response based on the type of challenge-response test selected and the variable used (the challenge).

In various implementations, the third processor module 212 may indicate that a fault is present in the primary EOCM 152 in response to at least a first predetermined number of failures (X) during a second predetermined number of control loops (Y). Failures include the second processor module 208 generating a response that is different than the expected response and the second processor module not responding within the predetermined period.

The third processor module 212 may take one or more remedial actions when a fault is diagnosed in the second processor module 208. For example, the third processor module 212 may disable communications from the primary EOCM 152 to the bus(ses) of the vehicle (via the disable signals 400 and 404) when a fault is diagnosed in the primary EOCM 152 and transition control of the actuators from the primary EOCM 152 to the redundant EOCM 156. The third processor module 212 may additionally take one or more other remedial actions, such as resetting the second processor module 208, setting a diagnostic trouble code (DTC) in memory, and/or illuminating a malfunction indicator lamp (MIL) when a fault is diagnosed.

While FIG. 4 illustrates only one control loop of the third processor module 212, the third processor module 212 executes control loops at a second predetermined rate. The second predetermined rate may be the same as or different (e.g., slower) than the predetermined rate at which the second processor module 208 executes control loops. As the type of challenge-response test to be performed during a given control loop is selected randomly from the predetermined set of challenge-response tests, four or more different types of challenge-response tests will be used for the performance of the randomized challenge-response test.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A diagnostic system for a vehicle, comprising:
a first processor module that includes a first microprocessor and memory; and
a second processor module that includes a second microprocessor and memory and that:
selectively transmits a first challenge to the first processor module for a first challenge-response test;
selectively transmits a second challenge to the first processor module for a second challenge-response test;
selectively transmits a third challenge to the first processor module for a third challenge-response test;
selectively transmits a fourth challenge to the first processor module for a fourth challenge-response test; and
selectively diagnoses a fault based on responses of the first processor module to the first, second, third, and fourth challenges,
wherein the first, second, third, and fourth challenge-response tests are each different types of challenge-response tests.

2. The diagnostic system of claim 1 wherein the second processor module diagnoses the fault in response to at least one of:
a first determination that the first processor module has not responded to the first challenge within a first predetermined period;
a second determination that the first processor module has not responded to the second challenge within a second predetermined period;
a third determination that the first processor module has not responded to the third challenge within a third predetermined period; and
a fourth determination that the first processor module has not responded to the fourth challenge within a fourth predetermined period.

3. The diagnostic system of claim 1 wherein the second processor module selects the first, second, third, and fourth challenge-responses tests from a group of at least four different types of challenge-response tests.

4. The diagnostic system of claim 3 wherein the second processor module selects the first, second, third, and fourth challenge-response tests from the group in a random order.

5. The diagnostic system of claim 3 wherein the group includes at least four of:
an arithmetic logic unit (ALU) test;
a cyclical redundancy check (CRC) test;
a power/voltage test;
a register test;
a clock test; and
a random access memory (RAM) health test.

6. The diagnostic system of claim 1 wherein the second processor module sets at least one of the first, second, third, and fourth challenges based on a time-varying variable.

7. The diagnostic system of claim 1 wherein the second processor module diagnoses the fault when at least one of:
a first expected value for the first challenge-response test is different than a first response of the first processor module to the first challenge;
a second expected value for the second challenge-response test is different than a second response of the first processor module to the second challenge;
a third expected value for the third challenge-response test is different than a third response of the first processor module to the third challenge; and
a fourth expected value for the fourth challenge-response test is different than a fourth response of the first processor module to the fourth challenge.

8. The diagnostic system of claim 7 wherein the second processor module:
determines the first expected value based on the type of the first challenge-response test and the first challenge;
determines the second expected value based on the type of the second challenge-response test and the second challenge;
determines the third expected value based on the type of the third challenge-response test and the third challenge; and
determines the fourth expected value based on the type of the fourth challenge-response test and the fourth challenge.

9. The diagnostic system of claim 1 wherein the second processor module sets a predetermined diagnostic trouble code (DTC) in memory and illuminates a malfunction indicator lamp when the fault is diagnosed.

10. A system of the vehicle, comprising:
the diagnostic system of claim 1,
wherein the first processor module generates processed data based on data from sensors that sense features outside of the vehicle, and
wherein the first microprocessor includes a graphical microprocessor; and
a third processor module that selectively actuates at least one of an electric power steering motor, friction brakes, and a throttle valve based on the processed data.

11. A diagnostic method for a vehicle, comprising:
providing a first processor module having a first microprocessor and memory; and,
at a second processor module that includes a second microprocessor and memory:
selectively transmitting a first challenge to the first processor module for a first challenge-response test;
selectively transmitting a second challenge to the first processor module for a second challenge-response test;
selectively transmitting a third challenge to the first processor module for a third challenge-response test;
selectively transmitting a fourth challenge to the first processor module for a fourth challenge-response test; and
selectively diagnosing a fault based on responses of the first processor module to the first, second, third, and fourth challenges,
wherein the first, second, third, and fourth challenge-response tests are each different types of challenge-response tests.

12. The diagnostic method of claim 11 further comprising diagnosing the fault, at the second processor module, in response to at least one of:
a first determination that the first processor module has not responded to the first challenge within a first predetermined period;
a second determination that the first processor module has not responded to the second challenge within a second predetermined period;
a third determination that the first processor module has not responded to the third challenge within a third predetermined period; and
a fourth determination that the first processor module has not responded to the fourth challenge within a fourth predetermined period.

13. The diagnostic method of claim 11 further comprising selecting, at the second processor module, the first, second, third, and fourth challenge-responses tests from a group of at least four different types of challenge-response tests.

14. The diagnostic method of claim 13 further comprising selecting, at the second processor module, the first, second, third, and fourth challenge-response tests from the group in a random order.

15. The diagnostic method of claim 13 wherein the group includes at least four of:
an arithmetic logic unit (ALU) test;
a cyclical redundancy check (CRC) test;
a power/voltage test;
a register test;
a clock test; and
a random access memory (RAM) health test.

16. The diagnostic method of claim 11 further comprising setting, at the second processor module, at least one of the first, second, third, and fourth challenges based on a time-varying variable.

17. The diagnostic method of claim 11 further comprising diagnosing the fault, at the second processor module, when at least one of:
a first expected value for the first challenge-response test is different than a first response of the first processor module to the first challenge;
a second expected value for the second challenge-response test is different than a second response of the first processor module to the second challenge;
a third expected value for the third challenge-response test is different than a third response of the first processor module to the third challenge; and
a fourth expected value for the fourth challenge-response test is different than a fourth response of the first processor module to the fourth challenge.

18. The diagnostic method of claim 17 further comprising, at the second processor module:
determining the first expected value based on the type of the first challenge-response test and the first challenge;
determining the second expected value based on the type of the second challenge-response test and the second challenge;
determining the third expected value based on the type of the third challenge-response test and the third challenge; and
determining the fourth expected value based on the type of the fourth challenge-response test and the fourth challenge.

19. The diagnostic method of claim 11 further comprising, at the second processor module, setting a predetermined diagnostic trouble code (DTC) in memory and illuminating a malfunction indicator lamp when the fault is diagnosed.

20. The diagnostic method of claim 11 further comprising:
generating processed data at the first processor module based on data from sensors that sense features outside of the vehicle,
wherein the first microprocessor includes a graphical microprocessor; and,
at a third microprocessor module, selectively actuating at least one of an electric power steering motor, friction brakes, and a throttle valve based on the processed data.

* * * * *